(12) United States Patent  
Flanagan et al.

(10) Patent No.: US 8,099,681 B2  
(45) Date of Patent: Jan. 17, 2012

(54) SYSTEMS AND METHODS FOR PROPAGATING ALERTS VIA A HIERARCHY OF GRIDS

(75) Inventors: William J. Flanagan, Eastville, VA (US); Larry D. Auton, Stirling, NJ (US); Keith B. Bingaman, Randolph, NJ (US); Charles Fleischman, Virgina Beach, VA (US); Philip M. Ginsberg, Newport Coast, CA (US); Robert Hargis, Alexandria, VA (US); Tom Lee, Middletown, NJ (US); Gary J. Murakami, New Providence, NJ (US); David A. Radi, Annapolis, MD (US); Kenneth R. Rodemann, Bridgewater, NJ (US); Gerald C. Vogel, Berkeley Heights, NJ (US); David M. Weimer, Matawan, NJ (US)

(73) Assignee: The Boeing Company, Chicago, IL (US)

( * ) Notice: Subject to any disclaimer, the term of this patent is extended or adjusted under 35 U.S.C. 154(b) by 1021 days.

(21) Appl. No.: 12/024,722

(22) Filed: Feb. 1, 2008

(65) Prior Publication Data

US 2009/0083676 A1   Mar. 26, 2009

Related U.S. Application Data

(60) Provisional application No. 60/974,728, filed on Sep. 24, 2007.

(51) Int. Cl.
   *G06F 3/048* (2006.01)
(52) U.S. Cl. ......... 715/853; 715/205; 707/737; 707/748
(58) Field of Classification Search .................. 715/853, 715/205; 707/737, 748
   See application file for complete search history.

(56) References Cited

U.S. PATENT DOCUMENTS 5,673,217 A * 9/1997 Imaizumi ................. 365/49.15
5,740,549 A * 4/1998 Reilly et al. ............... 705/14.42
(Continued)

OTHER PUBLICATIONS

International Search Report, PCT/US08/77393, mailed on Dec. 8, 2008.

(Continued)

*Primary Examiner* — Chat Do
*Assistant Examiner* — Phenuel Salomon
(74) *Attorney, Agent, or Firm* — Law Office of Donald D. Mondul

(57) ABSTRACT

The present solution addresses the displaying of multiple levels of information in a constrained display footprint in a manner that allows a user to be vigilant over the information. Systems and methods are described herein for organizing data and information queries against data sources in a relational display with hierarchical grids, linked to query results, score displays, and alert monitoring. In an embodiment of the present solution, a system allows an analyst to view results and status from monitoring numerous and persistent queries against real-time data streams. Many of these queries may be inter-related and composed in a way to comprehensively analyze a problem. To display, monitor, and interact with a collection of queries, the present solution provides a relational display that makes use of a set of grids via a feature referred to as "grid of grids". The grids may be arranged in a hierarchy of any number of levels. For example, the grids may be arranged as a directed acyclic graph to facilitate nesting of grids, in which the grids are expanded according to the complexity and levels of granularity in the decomposition of queries for a problem or domain of interest.

25 Claims, 10 Drawing Sheets

U.S. PATENT DOCUMENTS

| | | | |
|---|---|---|---|
| 6,112,203 A * | 8/2000 | Bharat et al. | 1/1 |
| 6,609,062 B2 * | 8/2003 | Hancock | 701/200 |
| 6,775,659 B2 * | 8/2004 | Clifton-Bligh | 1/1 |
| 2003/0020671 A1 * | 1/2003 | Santoro et al. | 345/1.3 |
| 2003/0043200 A1 * | 3/2003 | Faieta et al. | 345/804 |
| 2003/0197744 A1 | 10/2003 | Irvine | |
| 2004/0030741 A1 | 2/2004 | Wolton et al. | |
| 2006/0190833 A1 * | 8/2006 | SanGiovanni et al. | 715/767 |
| 2009/0019348 A1 * | 1/2009 | King | 715/205 |

OTHER PUBLICATIONS

Written Opinion of the International Searching Authority, PCT/US08/77393, mailed on Dec. 8, 2008.

* cited by examiner

SYSTEMS AND METHODS FOR PROPAGATING ALERTS VIA A HIERARCHY OF GRIDS

RELATED APPLICATIONS

This application claims priority to and the benefit of U.S. Provisional Patent Application No. 60/974,728, entitled "Systems and Methods For Propagating Alerts Via A Hierarchy of Grids", and filed on Sep. 24, 2007, which is incorporated herein by reference in its entirety.

GOVERNMENT SUPPORT

This invention was made with Government support under Government Contract No. HHM402-06-D-006 awarded by the Defense Intelligence Agency. The Government has certain rights in the invention.

FIELD OF THE INVENTION

The present application is generally directed towards propagating alerts from a lower level grid to a higher level grid in a hierarchy of grids.

BACKGROUND

The display of a computing device may be used to display information to a user, such as reports, data and the like. The size of the display's screen influences the amount of information that may be displayed to a user at a given time. Larger screens may be used to display more information to a user while smaller screens may display less information. In some cases, a user displays user interfaces from multiple programs, applications or reports on the screen of the computing device.

Each of these user interfaces takes up valuable viewing space on the screen. The user may not be able to place or position all the user interfaces in his or her view at one time. The display of one user interface may block or cover a portion of another user interface. As such, a user may not be able to see all the information that he would like to know about on the screen at a given time. The user may have to switch from displaying one application in the foreground of the display to another application. While a user interface or program is running in the background or while a user switches between programs, the user may miss useful information being displayed via these user interfaces.

A user may use a computer with multiple monitors to have additional screen space. Although the multiple monitor configuration provides greater viewing space, the user still may not be able to display all the user interfaces or reports at a given time. In some cases, a single program, application or report may display one screen or user interface of information at a time although the program or application may have other screens or user interfaces of information. For example, the user may have to click away from a first user interface of the program to see the data and information provided by a second user interface. As such, in some cases, a user is switching between multiple user interface or reports within the same application. When viewing one user interface, the user may miss viewing useful information or data being displayed in another user interface of the program not in view. Furthermore, the user's ability to view all or any of the useful information provided by a program at a given time may be further compounded by the wide variety of complexity and combination of user interfaces a program may provide.

SUMMARY

The present solution addresses the displaying of multiple levels of information in a constrained display footprint in a manner that allows a user to be vigilant over the information. Systems and methods are described herein for organizing data and information queries against data sources in a relational display with hierarchical grids, linked to query results, score displays, and alert monitoring. In an embodiment of the present solution, a system allows an analyst to view results and status from monitoring numerous and persistent queries against real-time data streams. Many of these queries may be inter-related and composed in a way to comprehensively analyze a problem. To display, monitor, and interact with a collection of queries, the present solution provides a relational display that makes use of a set of grids via a feature referred to as "grid of grids". The grids may be arranged in a hierarchy of any number of levels. For example, the grids may be arranged as a directed acyclic graph to facilitate nesting of grids, in which the grids are expanded according to the complexity and levels of granularity in the decomposition of queries for a problem or domain of interest.

The system of the present solution may perform real-time scoring on matches of queries against one or more data sources, such as data from real-time data streams. The system may generate alerts for any scores greater than some configured or determined thresholds, such as an alert in the case of a significant score. As part of the monitoring functionality of the relational display, the system propagates alerts via the hierarchy of grids, such that alerts from grids not in view may be communicated to the user via grids in view. For example, the system propagates the most significant alerts from the bottom of the hierarchy to higher level grids and/or to the top grid in the hierarchy. The present solution enables a user to monitor grids at a higher level in the hierarchy without missing alerts that occur at levels deeper in the hierarchy. Because the alerts propagate via the hierarchy all the way to the top most grid, the system may be used to monitor very large set of grids arranges in a hierarchy of any number of levels. In some embodiments, the system may display a thumbnail or reduced graphical representation of the top most grid persistently in view while navigating through other grids to provide vigilance of alerts across an entire hierarchy of grids.

The present solution improves the ability of data analysts to monitor a large set of query results from a large set of data sources. The system provides a solution for spatially organizing persistent queries into a hierarchy of grids in a relational display for displaying match scores and alerts. By propagation of scores and alerts via the hierarchy of grids, the user is able to monitor many thousands of queries and data sources within a small or reduced display footprint. In one embodiment, the system provides a depiction of grids with visual alerts as thumbnails nested with other grids, in a drill-down stack. In another embodiment, the system displays a grid shortcut that provides a reduced graphical depiction of propagated alerts within a set of grids or at a level within the hierarchy of grids. In response to the propagated alert, the user may click within a grid to drill down into deeper levels of the hierarchy to locate alerting queries and view the query results that triggered the alert. The systems and methods described herein include features to provide for the construction and arrangement of grids, organizing and decomposing query results, navigation to or from different grained decompositions, navigation to individual query results, display of scores for query results, display of alerts for query results, and monitoring of alerts for query results. Furthermore, the present solution may provide system-wide alerting to multiple users based on score value, as well as user-defined alerting triggered by any new match with a query.

The system of the present solutions allows the creation, modification and configuration of grids in a grid hierarchy. A grid may be linked to other grids and grids copied between different grid hierarchies or different levels within the same hierarchy. The same grid may be linked to another grid at any level in the hierarchy, a technique referred to as "deep copying." By providing linking from many grid cells to the same grid, the system supports a directed acyclic graph structure instead of just a tree structure. The advantages to the user are that a grid that is a relevant unit within multiple contexts may be referenced from each of these contexts yet maintained in a single instance. Grid copying provides ease of adapting an existing grid and any child grids for a new purpose. The system also provides for exporting and sharing grid hierarchies between different users.

In one aspect, the present invention is related to a method for providing in a first grid display an alert of a status of a query from a second grid display of a plurality of grid displays arranged in a hierarchy. Each of the grid displays provide an arrangement of grid cells, with each grid cell comprising one or more indicators for indicating the status of the query monitoring one or more data sources. The method includes the step of displaying on a presentation medium, such as screen or a printer, a first grid display at a first level in a hierarchy of grid displays. The first grid display has a first arrangement of grid cells with each of the grid cells including an element to indicate status of a query monitoring one or more data sources. For example, the element may include a graphical element for visually indicating the status of a query. The one or more grid cells of the first arrangement identifying one or more grid displays at a second level in the hierarchy different than the first level. The method further includes the step of displaying a reduced representation, such as a thumbnail, of a second grid display as an element in a first grid cell of the first grid display to identify status of one or more queries within the second grid display. The second grid display maintains off display via the presentation medium, such as the screen, a second arrangement of grid cells having queries monitoring one or more data sources. The method includes determining a status of a match of the query with data from the one or more monitored data sources. The query is identified by a second grid cell of the second grid display. In response to the determination, the method includes providing an indicator of the status of the query at a location in the reduced representation corresponding to a relative location of the second grid cell within the second grid display. The indicator may be a visual indicator.

In another aspect, the present invention is related to a method for identifying in a thumbnail representation of a grid display a status of queries from a plurality of grid displays arranged in a hierarchy. The grid display maintaining an arrangement of grid cells with each grid cell including an element for indicating the status of a query monitoring one or more data sources. The method includes maintaining, via a plurality of grid displays arranged in a hierarchy having a plurality of levels, an arrangement of grid cells. Each grid cell having an element—graphical, textual, audio or otherwise—for indicating status of one or more queries monitoring one or more data sources. The method includes displaying on a presentation medium, such as screen or a printer, a reduced representation or thumbnail of a grid to identify status of queries within one or more grid displays below an identified level in the hierarchy. Each location of a status identifier in the thumbnail representation corresponds to a relative location of a grid display below the identified level. The method also includes the step of determining the status of a match of a query corresponding with data from the one or more monitored data sources. The query may be identified by a first grid cell of a first grid display and the first grid display may be identified via one or more grid cells of the one or more grid displays. In response to the determination, the method further includes the step of providing an indicator of the status of the query at the location in the thumbnail representation corresponding to the status identifier for the one or more grid displays identifying the first grid display.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
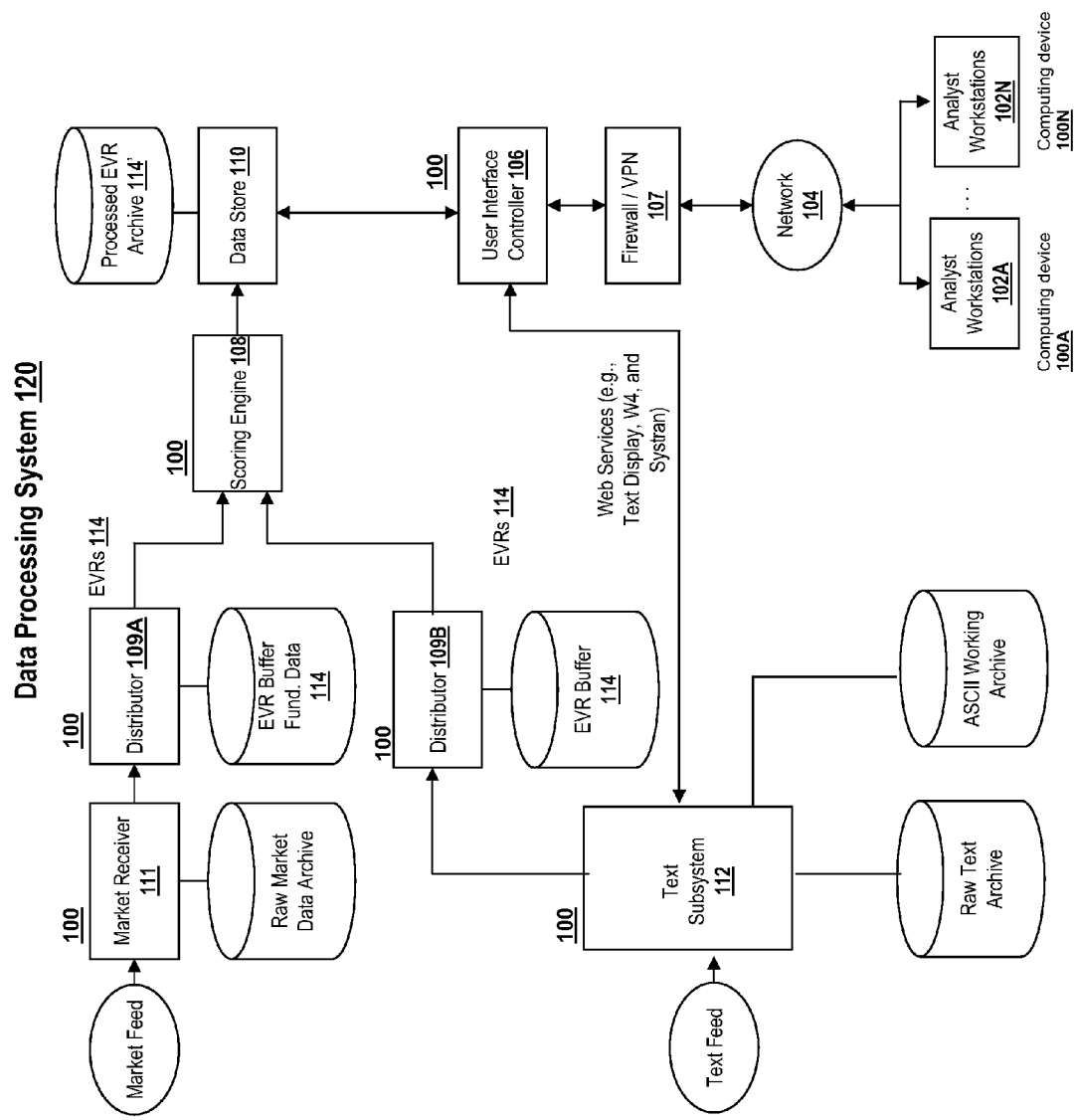
FIG. 1A is a block diagram that depicts an embodiment of a system environment and network for providing data processing.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments of the present invention below, the following descriptions of the sections of the specification and their respective contents may be helpful:

Section A describes a data processing system and computing environment useful for practicing an embodiment of the present invention; and Section B describes embodiments of systems and methods of providing a hierarchy of grids and propagating alerts through the hierarchy of grids.

A. Data Processing and Computing Environment

Prior to discussing the specifics of embodiments of the systems and methods for providing a hierarchy of grids and propagating alerts via the hierarchy of grids, it may be helpful to discuss the processing and computing environments in which such embodiments may be deployed. Referring now to FIG. 1A, an embodiment of a data processing environment is depicted. In brief overview, the data processing system 120 includes one or more data feeds, such as a market data feed and text data feed. A market data receiver 111 receives and processes the market data, saves the market data to a data storage and forwards the data to a distributor 109A. A text data receiver or subsystem 112 receives a feed of text data, processes the text data, saves the data to a data storage and forwards the data to a distributor 109B. The distributors 109 convert the data to a predetermined or standard data form and generate event records from the data. The distributor stores the event record data 114 in a data storage and forwards the data to a scoring engine 108. The scoring engine 108 performs scoring of matches of query results against the data. The scoring engine 108 generates score results and processed event records. The scoring engine 108 stores these results and processed records to a data store 110, which may include an archived data storage. A user interface controller 106 may control the data distributed, presented or communicated between the data processing system 120 and one or more analyst workstations 102A-102N. The workstations 102 may connect to the data processing system 120 via a network 104 and optionally, a firewall and/or virtual private network device 107.

The data processing system 120 may connect to, communicate with or obtain data from any type and form of a data source, including any type and form of a data feed or a data stream, such as the market feed and text feed depicted in FIG. 1A. In some embodiments, the data source may include one or more databases accessible via a network 104, such as the Internet. In other embodiments, the data source may include data on any type of storage medium, such as CD, DVD, tape, portable disk media, etc. In another embodiment, the data source may include streaming of data using any type and form of streaming protocol. For example, in one embodiment, the data source may include a real-time streaming news or stock market data feed. In another example, the data source may comprise any data communicated via Voice over Internet Protocol (VoIP). In some embodiments, the data source included any electronically recorded communications, such as phone communications, videos, broadcasts, etc. In other embodiments, the data source may be communicated by a computing device 100 to the data processing system 120 using any application layer protocol, such as markup language data communicated over a Transport Control Protocol (TCP)/Internet Protocol (IP). For example, the market feed may include data communicated using Hypertext Markup Language (HTML) or Extensible Markup Language (XML). In another embodiment, the data processing system 120 may receive or obtain data from a data source using any proprietary protocols or communications mechanisms. In other embodiments, the data source includes text based data.

The market receiver 111 may include software, hardware or any combination of software and hardware for receiving and processing data from a data source, such as a market feed. The market receiver 111 may include an application, program, library, service, task, process, thread or any type and form of executable instructions. The market receiver 111 comprises logic, function or operations to receive or obtain data from a market feed, such as a data feed from a stock market or stock exchange. The market receiver 111 may be adapted, designed or constructed to receive, interpret or otherwise process data from predetermined market feeds and having a predetermined format and/or protocol. In some embodiments, the market receiver 111 queries data from a data source, such as on a predetermined frequency. The market receiver 111 may parse, extract, convert, change or modify the data into another form or otherwise for processing or communicating to a distributor 109. The market receiver 111 may store the received or obtained market data to any type and form of storage, such as persistent storage or a database.

Likewise, the text subsystem 112 may include software, hardware or any combination of software and hardware for receiving and processing data from a data source, such as a text feed. The text subsystem 112 may include an application, program, library, service, task, process, thread or any type and form of executable instructions. The text subsystem 112 comprises logic, function or operations to receive or obtain data from a text feed. In some embodiments, the text subsystem 112 queries data from a data source, such as on a predetermined frequency. The text subsystem 112 may be adapted, designed or constructed to receive, interpret or otherwise process text based data having any type of format and/or protocol. The text subsystem 112 may parse, extract, convert, change or modify the data into another form or otherwise for processing or communicating to a distributor 109. In one embodiment, the text subsystem 112 processes the text data or modifies, adapts or converts the data into an ASCII based format. The text subsystem 112 may store the received or obtained text feed data to any type and form of storage, such as persistent storage or a database. In some embodiments, the text subsystem 112 stores the ASCII formatted data to a separate data storage.

In some embodiments, the market receiver 111 and text subsystem 112 may comprise a single component or subsystem for processing multiple types of data, such as market feed data and text feed data. For example, in one embodiment, the market receiver 111 includes the text subsystem 112, or any portion thereof. In another embodiment, the text subsystem 112 includes the market receiver 111, or any portion thereof. The market receiver and text subsystem may store received and/or processed data into the same storage, such as in a relational database. The market receiver 111 and/or text subsystem 112 communicates, forwards or provides the data from the market feed and/or text feed to one or more distributors 109A-109B.

The distributor 109 includes software, hardware or any combination of software and hardware for converting the data into a predetermined or standard format for the data processing system 120 and/or generating events from the data for further processing by the system 120. The distributor 109 may include an application, program, library, service, task, process, thread or any type and form of executable instructions. The distributor 109 may receive the data real-time from the market receiver 111 and/or text subsystem 112. In other embodiments, the distributor queries or receives the data from the market receiver 111 and/or text subsystem 112 at a predetermined frequency. The distributor 109 may convert the data into any type of format, such as a text based or binary based format. In some embodiments, the distributor 109 converts the data into a format of a markup language. In other embodiments, the distributor 109 converts the data into a proprietary format, such as any format designed for more efficient or effective processing by other components or subsystems of the data processing system 120.

The distributor 109 may generate an event record 114 indicating an event determined from applying a query to each received data stream, set of data, or data records. A query may comprise one or more search terms, parameters and/or conditions to find or determine an event of interest in the data. If a query matches data from the data source, the distributor 109 generates an event record 114 indicating the match or a portion thereof. The distributor 109 may create a record of the event, or event record 114 (also sometimes referred herein as an EVR 114), using any type and form of data record and format. The distributor 109 may archive or store the generated event records 114 to a data storage. In other embodiments, the distributor 109 stores the EVRs 114 in memory, such as in a buffer or queue. The distributor 109 communicates the EVRs 114 to the scoring engine 108. In some embodiments, the distributor 109 communicates the EVRs 114 to the scoring engine 108 as they are generated or real-time. In other embodiments, the distributor 109 communicates the EVRs 114 to the scoring engine 108 in a batch mode. In another embodiment, the distributor 109 communicates the EVRs 114 to the scoring engine 108 at a predetermined frequency. In other embodiments, the scoring engine 108 performs the matching of queries to data provided from the distributor 109.

The scoring engine 108 comprises software, hardware or any combination of software and hardware for scoring event records 114. The scoring engine 108 may include an application, program, library, service, task, process, thread or any type and form of executable instructions. The scoring engine 108 may use any type and form of algorithm and/or modeling to score EVRs 114. The scoring engine 108 may provide a score as a numerical or quantitative indicator. In one embodiment, the scoring engine 108 provides a score as a percentage. In another embodiment, the scoring engine 108 provides a number on any type and form of scale, such as a number between 1 and 100. In other embodiments, the scoring engine 108 may provide a score as a string, text or alphanumeric indicator. In another embodiment, the scoring engine 108 provides a score as a qualitative indicator of the match to the data. In some embodiments, the scoring engine 108 provides multiple scores for each EVR 114, with each score corresponding to a different measurement, scoring model or scoring algorithm.

The scoring engine 108 may provide a score for each EVR or event record 114. In some embodiments, the scoring engine 108 does not provide a score for the event record 114 if the event record is missing data or not having enough information. In other embodiments, the scoring engine 108 provides a score for a batch of event records or a series of event records. In another embodiment, the scoring engine 108 determines a set of EVRs 114 are related and provides a score for the related EVRs 114. In further embodiments, the scoring engine 108 provides a plurality of different scores or measurements for each EVR 114 or set of EVRs 114.

The scoring engine 108 may store the scored EVR 114 to a data store 110, which may include any type and form of storage. In some embodiments, the data store 110 comprises a database, such as a relational or object-based or object oriented database. In some embodiments, the scoring engine 108 may archive or backup data to an archive data storage. The scoring engine 108 may store the EVR 114 in a manner or arrangement in the data store 110 to identify or associate the one or more corresponding generated scores.

The user interface controller 106 comprises software, hardware or any combination of software and hardware for controlling and managing the user interface or presentation layer of the data processing system 120. The user interface controller 106 may include an application, program, library, service, task, process, thread or any type and form of executable instructions. The user interface controller 106 obtains data from the data store 110 and/or text subsystem 112. The user interface controller 106 processes this data and provides the data to the workstations 102 for presenting the data to the user, such as via any of the relational display and grid based techniques discussed herein. The user interface controller 106 may process, control or manage the data in any manner desirable for arrangement and display on a user interface. The user interface controller 106 may receive user input from a user interface displayed on the workstation 102. Based on the input, the user interface controller 106 may retrieve data from the data store 110. In some embodiments, based on the input, the user interface controller 106 adds, modifies, or configures data in the data store 110.

In some embodiments, the user interface controller 106 comprises a web server and provides web pages to the workstations 102 for displaying data from the data store 110 or for receiving input from the user. In other embodiments, the user interface controller 106 or a portion thereof operates or resides on the workstation 102. In these embodiments, a first portion of the user interface controller 106 distributes data to a second portion of the interface controller 106 on the workstation for displaying locally on the display of the workstation 102.

In one embodiment, the user interface controller 106 may obtain data for presentation to the workstation 102 via the text subsystem 112, such as via any type and form of web services. The user interface controller 106 may interface to or use any type and form of statistical and analytical software package for processing the data from the text subsystem 112 or the data store 110. The user interface controller 106 may interface to or use any type and form of work flow processing software for processing data from the text subsystem 112 or the data store 110. In another embodiment, the user interface controller 106 includes or interfaces any type and form of translation software or services to translate any data from one language to another language.

The user interface controller 106 may establish, control and manage one or more user connections or sessions to the data processing system 120. In some embodiments, the user interface controller 106 provides authentication, authorization and/or auditing services for users and/or devices connecting to the system 120. In other embodiments, the user interface controller 106 establishes and manages any type and form of subscription to any of the data available via the data processing system 120. In some embodiments, the user interface controller 106 distributes, broadcasts or multi-casts data from the data processing system 120 to a plurality of workstations 102.

Figure 1B:
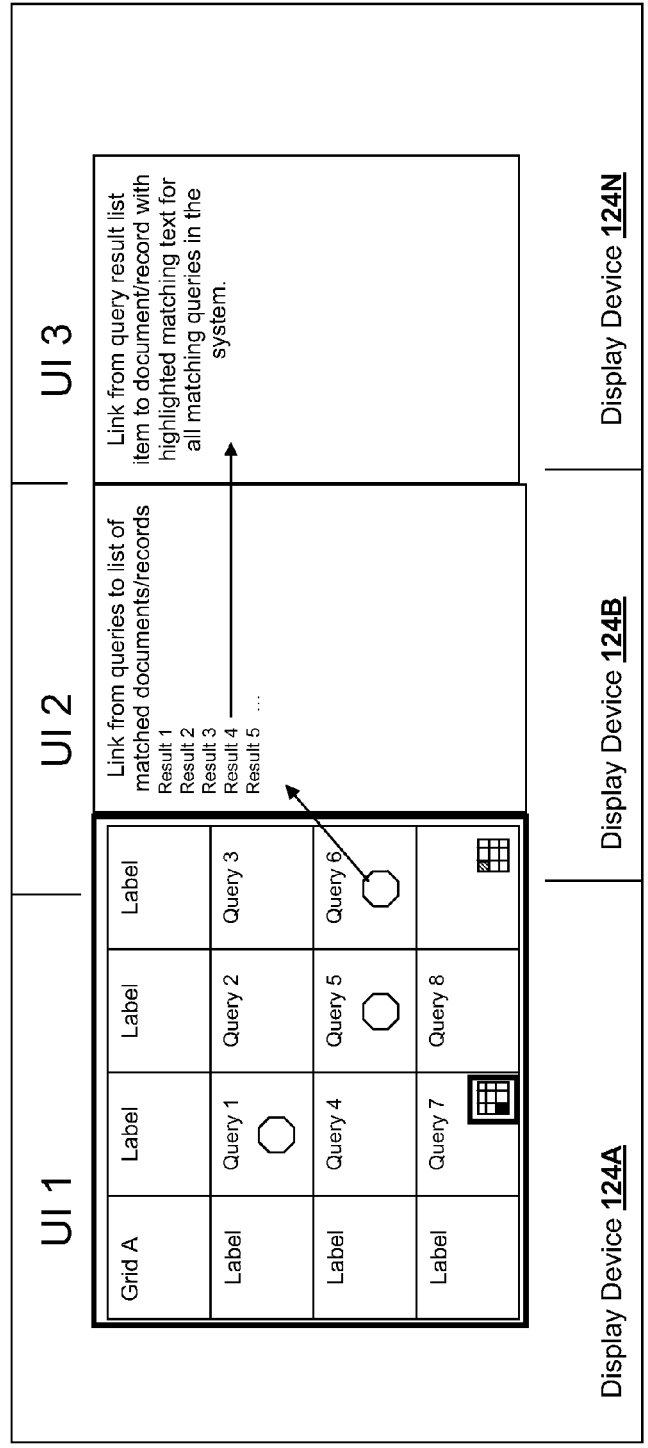
FIG. 1B is a block diagram that depicts an embodiment of a relational display of a graphical user interface in a multi-monitor environment.

In further embodiments, the user interface controller 106 includes any type and form of configuration tool, mechanism or interface for creating, editing, copying, configuring or specifying a user interface, such as any of the user interfaces of the relational display depicted in FIG. 1B. The configuration tool may be used to configure one or more grids. In one embodiment, the configuration tool provides an interface for specifying or arranging a hierarchy of grids, such as those discussed below in connection with FIGS. 2A-2C. In some embodiments, the configuration tool provides an interface to create, arrange, manage, edit and configure cells of a grid. In some embodiments, the configuration tool provides an interface to create, edit or specify a query for any cell. In another embodiment, the configuration tool provides an interface for configuring or specifying any scoring thresholds, scoring models and/or scoring indicators.

Although the data processing system 120 is depicted in FIG. 1A with multiple separate components, such as the market receiver 111, text subsystem 112, distributor 109, scoring engine 108 and user interface controller 106, any of these components may operate on the same computing device 100 or different computing devices in any combination. Furthermore, any of these components may be combined into one or more components, such as a single component running on one computing device 100.

The workstations 102A-102N may comprise any type and form of computing device 100. The workstations 102A-102N connect via network 104 to the data processing system 120, such as via the user interface controller 106. In some embodiments, the workstation 102 is on the same network as the data processing system 120. In other embodiments, the workstation 102 is on the same network 104 as the user interface controller 106. In another embodiment, the workstation 102 is on a different network 104 than the user interface controller 106. The workstation 102 may connect from a first network 104 to the data processing system 120 on a second network 104' via a firewall and/or virtual private network device 107. In some embodiments, the VPN device 107 provides a Secure Socket Layer (SSL) VPN connection to the network of the data processing system 120. In other embodiments, the VPN device 107 provides an IPsec based VPN connection to the network of the data processing system 120.

Still referring to FIG. 1A, the network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

Although FIG. 1A shows a network 104 (generally referred to as network(s) 104) any portion of the data processing system 120 may reside on other networks 104', 104". For example, the market receiver 111 or text subsystem may be on a first network, the data store 110 and user interface controller 106 on a second network 104" and the analyst workstation 102A-102N on a third network 104. The networks 104, 104' and 104" can be the same type of network or different types of networks. The network 104 may be a local-area network (LAN), such as a company Intranet, a metropolitan area network (MAN), or a wide area network (WAN), such as the Internet or the World Wide Web. The networks 104 may be a private or public network. In one embodiment, network 104' or network 104" may be a private network and network 104 may be a public network. In some embodiments, network 104 may be a private network and network 104 a public network. In another embodiment, networks 104, 104' may be private networks.

The workstation 102 is used by an end user, such as an analyst to view, interface and monitor the data processed by the data processing system 120. The system 120 may present via the workstation 120 data in any format, combination and arrangement via any type and form of graphical elements, widgets or elements. In some embodiments, the system 120 presents the data in various grid formats or grid displays, including any of the relational display and hierarchical grid display techniques discussed herein.

Referring now to FIG. 1B, an example of an embodiment of a relational display provided via the data processing system 120, the user interface controller 106 and a workstation 102 is depicted. In some embodiments, the data processing system 120 provides multiple user interfaces presented, arranged and organized in a related manner, referred to as a "relational display." In brief overview, the data processing system may present a first user interface UI1, a second user interface UI2, and a third user interface UI3 via one or more display devices 124A-124N of the workstation 102. These user interfaces UI1, UI2 and UI3 may present monitored date received from the market and text feeds and processed via the data processing system 120. Although generally referred to as first, second and third user interfaces, these user interfaces may be components of, screens of or portions of a single user interface.

In some embodiments, each of the user interfaces UI1, UI2 and UI2 present different levels of granularity of the same set of monitored data. For example, the user interface UI may present a grid display comprising multiple cells. Each cell may include a query against the one or more data sources. This cell and the query may be referred to as an entity. A cell may provide one or more indicators, visual, audio or otherwise, for indicating the status of queries, such as any scores of queried and/or matched data provided by the scoring engine 108. These indicators may include graphics, such as text and animation, for providing a visual indication on the grid of the status of a query. With the user interface UI1, a user may see the activity of many sets of queries in a single view.

The second user interface UI2 may provide further information of any one or more cells and corresponding queries or scores of the first user interface UI1. In the example of FIG. 1B, the second user interface UI2 may display a list of data records corresponding to or matching a query of a cell. In some embodiments, the user interface UI2 displays an enumerated list of records from the data source 110 related to or associated with a cell or query from the cell of a grid of the first user interface UI1. In one embodiment, a user selects a cell of a grid in the first user interface UI1 and the system 120 presents additional information and data regarding the selected cell in the second user interface UI2, such as data records matching the query. In some embodiments, the second user interface UI2 presents the enumerated list of data records corresponding to the cell in a determined order. In one embodiment, the list of data records is enumerated in a temporal manner, such as by date or by most recent activity. In another embodiment, the list of data records is ordered according to score either in ascending or descending order.

The third user interface UI3 may provide further data and information regarding any of the data and information presented via the second user interface UI2. In some embodiments, the third user interface UI3 may present data regarding any of the results of the queries presented in the second user interface UI2 for a cell selected in the first user interface UI. For example, the third user interface UI3 may present the document of a result of query selected or highlighted in the second user interface UI2. In some embodiments, the third user interface UI3 highlights one or more search terms, parameters or criteria in the displayed document. These highlighted terms may correspond to the selected result of the second user interface UI2 corresponding to the selected cell of the first user interface UI1.

In view of the user interfaces UI1, UI2 and UI3, a relational display is formed to show information from a higher level of granularity (e.g., a grid of queries) to a lower or more detailed granularity (e.g., a document resulting from a query of a cell). Although FIG. 1B depicts three user interfaces related to each other, more user interfaces may be used to represent any number of levels of granularity of the data. Furthermore, although the user interfaces UI1, UI2 and UI3 are displayed in a side-by-side fashion in a row, the user interfaces UI1, UI2 and UI3 may be displayed in any arrangement vertically, horizontally, diagonally, overlapping, or otherwise. For example, the user interfaces may be displayed in a column fashion with the second user interface under the first user interface and the third user interface under the second user interface.

The workstation 102 may use a plurality of display devices 124A-124N (discussed further below) to provide a multi-monitor environment for displaying the relational display as depicted in FIG. 1B. Any of the user interfaces UI, UI2, and UI2 may be displayed on any display device 124 of the multi-monitor environment or on a portion of one display device and a portion of a second display device. In one embodiment, the first user interface UI is displayed on a first display 124, the second user interface UI2 on a second display 124B and a third user interface on a third display 124N. In other embodiments, portions of the first user interface UI1 may be displayed on both the first display 124A and the second display 124B. In another embodiment, portions of the second user interface UI2 may be displayed on the both the second display 124B and the second display 124N. Although FIG. 1B depicts a three display monitor environment, the workstation may use a single display device, two display devices or more than three display devices.

In some embodiment, the relational display provided by the user interfaces UI1, UI2 and UI3 may be web-based and provided by any arrangement and combination of web-pages, hyperlinks, and other web-based content. For example, each of the user interfaces may be represented by a series of selectable tabs or menus on a web-page. In another example, each of the user interfaces may be presented in separate browsers or frames of a browser.

Figure 1C:
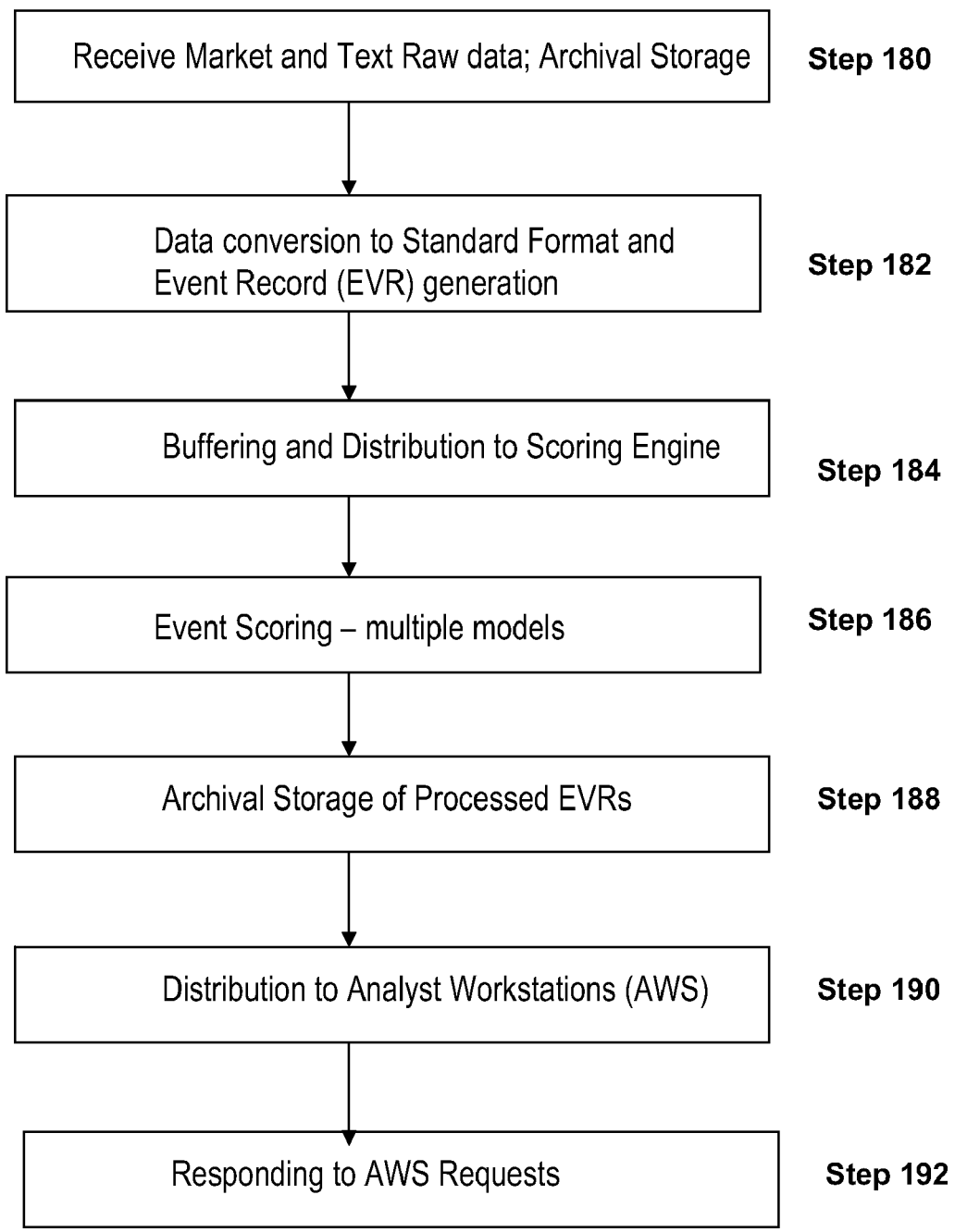
FIG. 1C is a flow diagram that depicts an embodiments of steps of a method for processing data.

Referring now to FIG. 1C, an embodiment of steps of operation of the data processing system 120 is depicted. In brief overview, at step 180, the data processing system receives market and text data, such as via the market receiver 111 and the text subsystem 112. This data is processed and stored in data storage, such as for archival.

The market receiver and text subsystem forward this data to the distributor 109 for further processing. At step 182, the distributor 109 converts the data to a predetermined format and generates event records 114 from the data. The distributor 109 may generate event records based on queries matching data. At step 184, the distributor 109 buffers the converted data into a buffer and distributes the data to a scoring engine 108. At step 186, the scoring engine 108 performs scoring on the EVR 114 data using one or more scoring algorithms or models. At step 188, the scoring engine 108 stores the scored EVR data to a data storage 110, which may be archived to an archival storage. At step 190, data processed by the data distribution system 120, such as scored EVR data, may be distributed via the user interface controller 106 to one or more workstations 102 for display such as via the relational display system of FIG. 1B. At step 192, the user interface controller 106 and data processing system may receive any requests or user input via the workstation 102, such as user interacting with any of the data displayed via the relational display.

Computing Device

Figure 1D:
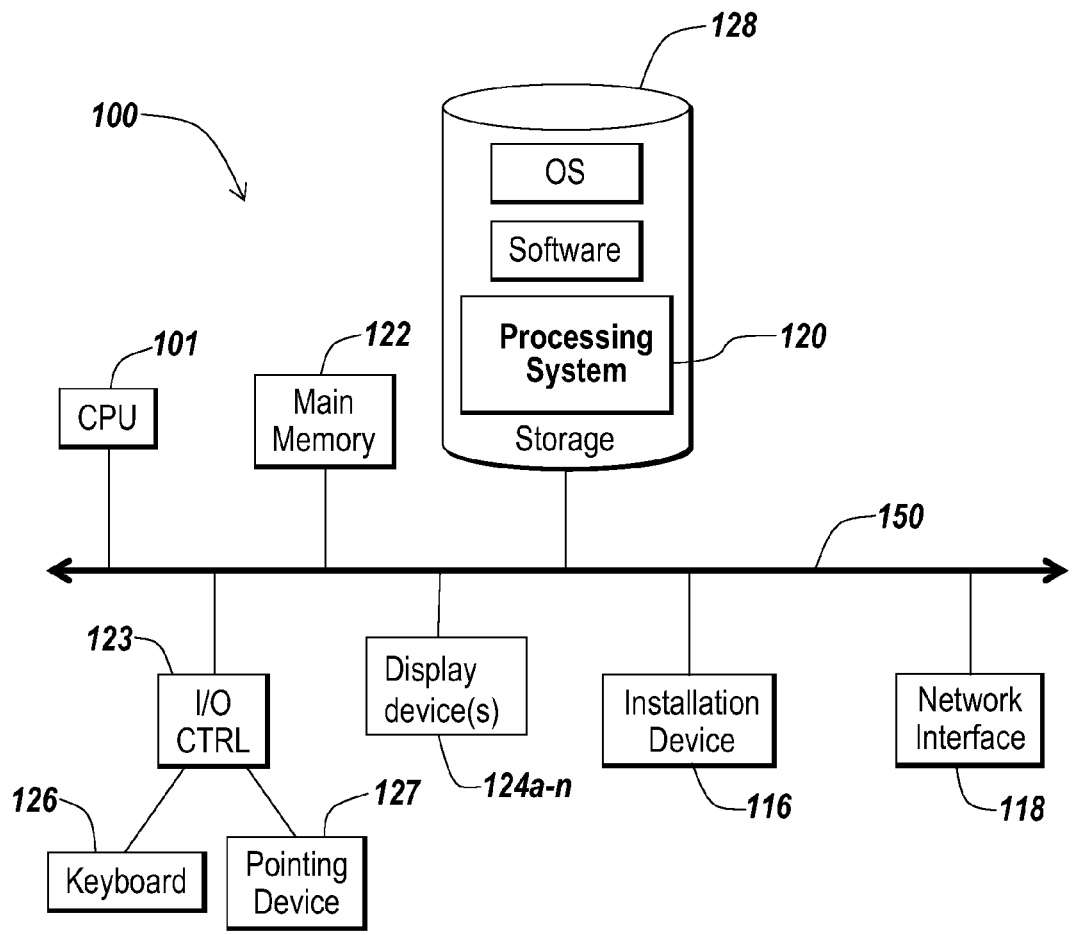
FIGS. 1D and 1E are block diagrams of an embodiment of a computing device.
Figure 1E:
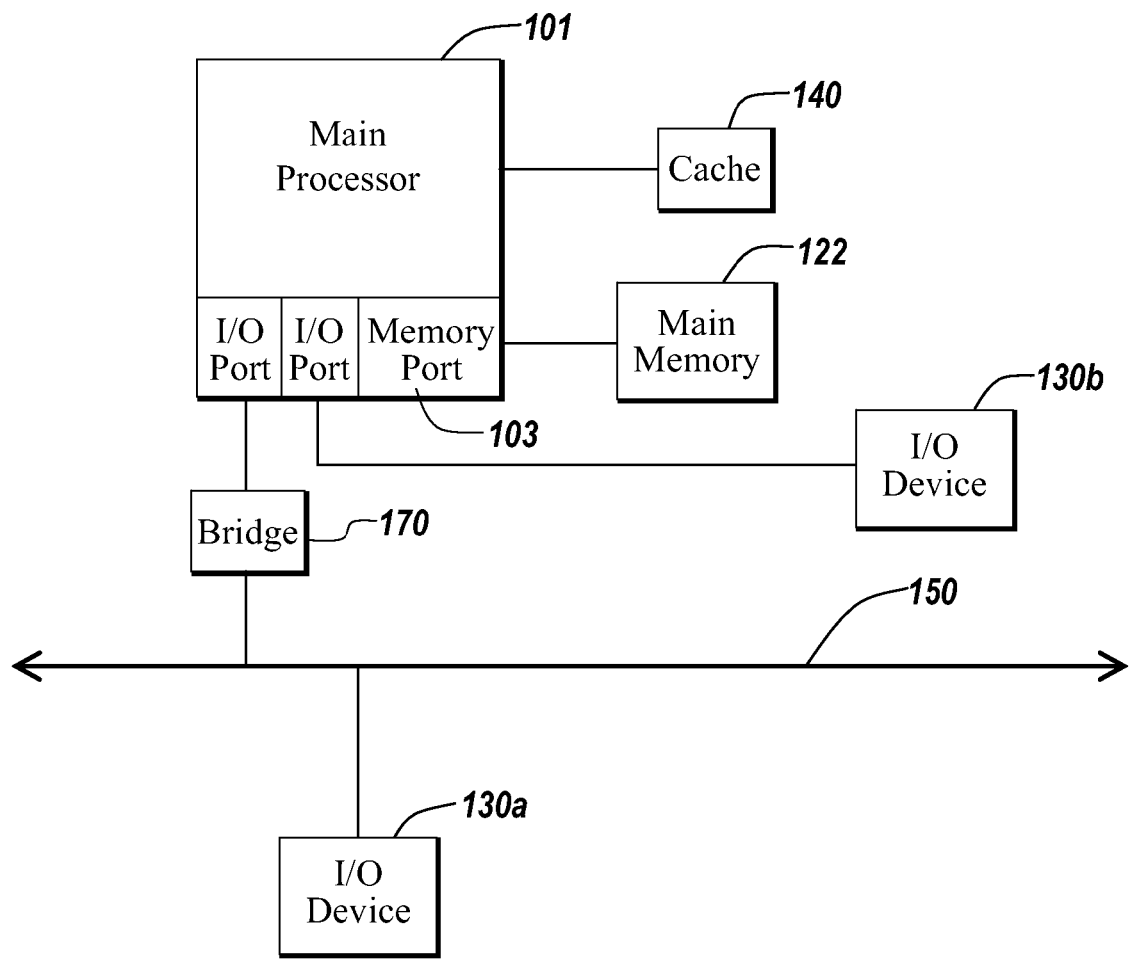

The data processing system 120, or any components thereof may be deployed as and/or executed on any type and form of computing device 100, such as a computer, network device or appliance capable of communicating on any type and form of network and performing the operations described herein. FIGS. 1D and 1E depict block diagrams of a computing device 100 useful for practicing an embodiment of the data processing system 120.

As shown in FIGS. 1D and 1E, each computing device 100 includes a central processing unit 101, and a main memory unit 122. As shown in FIG. 1D, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1D, the processor 101 communicates with main memory 122 via a system bus 150 (described in more detail below). FIG. 1D depicts an embodiment of a computing device 100 in which the processor communicates directly with main memory 122 via a memory port 103. For example, in FIG. 1E the main memory 122 may be DRDRAM.

FIG. 1E depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1D, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1E depicts an embodiment of a computer 100 in which the main processor 101 communicates directly with I/O device 130 via HyperTransport, Rapid I/O, or InfiniBand. FIG. 1E also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any data processing system 120, or portion thereof. The computing device 100 may further comprise a storage device 128, such as one or more hard disk drives or redundant arrays of independent disks, for storing an operating system and other related software, and for storing application software programs such as any program related to the data processing system 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1D. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1D and 1E typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Grids of Grids Relational Display

Figure 2A:
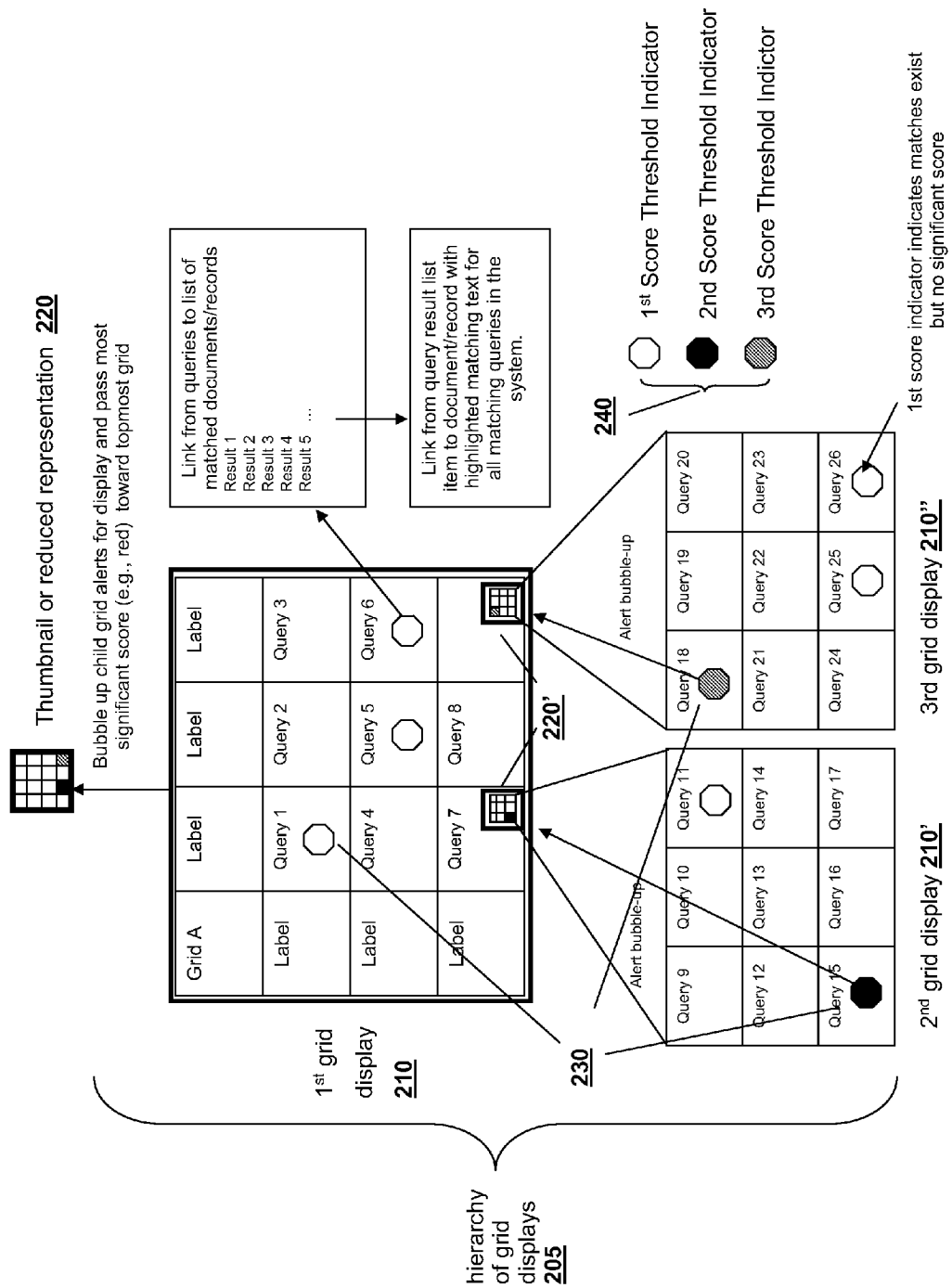
FIG. 2A is a block diagram of one embodiment of a grid of grids hierarchy.

Referring now to FIG. 2A, an embodiment of providing a hierarchy of grids or grid display, such as for a relational display is depicted. In brief overview, a hierarchy of grid displays 205 includes a plurality of grid displays 210-210" arranged in a hierarchy. A first grid display 210 at a first level in the hierarchy 205 identifies or is linked to a second grid display 210' at a second level in the hierarchy 205. The first grid display 210 at the first level of the hierarchy 205 may be linked to a third grid display 210" at a second or third level in the hierarchy. The second and third level of the hierarchy may be any level below the first level of the hierarchy, which, in some embodiments, may be the top most grid in the hierarchy 205. Each of the grids 210 may include a plurality of grid cells. Each grid cell may correspond to and include a query monitoring a data source. The grid cell may include an indicator 230 providing an indication of the status and/or score of a query against a data source. For example, the indicator 240 may include one or more score identifiers 240 to indicate a predetermined level of score or score threshold. A reduced representation of a grid 220, such as a thumbnail, may be used to display the status and scores of a grid display 210 in the hierarchy 205 whether or not the grid display 210 is displayed or in view.

A grid display 210', or grid 210", may comprise any arrangement and/or combination of grid cells or entities. In some embodiments, the grid display 210' may arrange grid cells into a row and a column format to make a grid of any size, e.g., N×N. The grid 210 may include row and/or column headers such as any type and form of labels, text or graphical, as depicted in FIG. 2A. In some embodiments, the grid 210 may have more rows than columns. In other embodiments, the grid 210 may have more columns than rows. In one embodiment, the grid 210 has the same number of rows as columns. In some embodiments, a cell of a grid 210 only has a label and no queries. In other embodiments, the cell of a grid does not include any queries.

The grid cells, sometimes referred to as entities, may include any type and form of queries for monitoring one or more data sources. The query may be a persistent query that is applied to any data received real-time via the market feed and/or text feed such as those described in connection with FIG. 1A. The query may include search terms, search parameters and/or conditions for matching data from a data source. The query may also include an identification of the data source to be searched. In some embodiments, the query includes a database query statement, such as SQL database statements for a relational database with any conditional clauses.

In some embodiments, a grid cell may include an identification of a link to or association with another grid 210. For example, as depicted in FIG. 2A, the query 7 cell of the first grid display 210 identifies and/or is linked to the second grid display 210'. In another example, the grid cell in the bottom right hand corner of the first grid display 210' identifies and/or is linked to the third grid display 210". Any or all of the grid cells of the first grid display may identify or be linked to any other grid 210 at any level or depth in the hierarchy of grids 205. In some embodiments, any grid cell may be linked to any other grid, or cell thereof, at any level or depth in the hierarchy of grids provided there are no cycles that result. One cell may link to a grid at a second level, another cell to a grid at a third level, and yet another cell to a grid at a nth level in the hierarchy 205. Likewise, any grid cells of the second grid display 210' and/or the third grid display 210" may identify or link to any grid at any level in the hierarchy 205.

A grid cell may include any type and form of indicator 240 to provide information on a status, state or condition of a query. The indicator 240 may comprise a visual indicator, audio indicator, sensory indicator or any combination of visual, audio or sensory indicator. In some embodiments, the indicator comprises any arrangement of graphics and/or text. In another embodiment, the indicator comprises any type and form of animation, such as blinking or highlighting. In one embodiment, the indicator comprises any type and form of statistical information in text or graph form, such as a histogram. In other embodiments, the indicator comprises any type and form of graphical or text representation of temporal information, such as a clock. In another embodiment, the indicator comprises a predetermined color to represent or correspond to a status, event or score. In yet other embodiments, the indicator comprises a predetermined shape to represent or correspond to a status, event or score.

The indicator 240 may also comprise any auditory, force, and/or tactile feedback either with or without a visual indicator. In some embodiments, any type of sound may be used as the indicator 250. For example, a bell or ringing sound may be used as the indicator 240. In another example, any type of musical related notes, tunes or portions of music, such as the ring tones associated with a cellular phone, may be used. In a further example, a computer generated or a human recorded voice may be used to provide the indicator 240. Additionally, the indicator 240 may comprise any touch sensory output from any type of haptic device, such as a vibration generating mouse, joystick or other input device. In other embodiments, the indicator 240 may be any type of output produced by any accessibility feature, such as those for users with any type of impairment or disability, of the operating system, data processing environment 120, user interface, or any other software and/or hardware of the computing device 102. One ordinarily skilled in the art will appreciate the various types and forms of sensory feedback that may be used in practicing the present invention as described herein. Additionally, one ordinarily skilled in the art will further appreciate that any combination of visual, auditory, force, and tactile indicators may also be used for the indicator 240.

The indicator 240 may be used to convey information about the status state or condition of a query or to identify an event or score. In some embodiments, the indicator 240 may include different representations to represent different levels of a score or a match exceeding a predetermined score threshold. The indicator 240 may indicate if a score of a match for a query is below a predetermined score threshold. In one embodiment, the indicator 240 indicates the existence of an event, such as a match of a query to data from a data source. In other embodiments, the indicator 240 indicates whether or not a user has acknowledged the event indicated by the indicator 240. In some embodiments, the indicator 240 indicates temporal status of the event, such as an absolute or relative length of time since the event occurred or has been acknowledged.

The grids may be used to monitor results of many queries against one or more data sources on a real-time basis or otherwise. By way of example and as depicted in FIG. 2A, a first indicator represented by the white indicator may be used to indicate a first score threshold of a query, such as a query match but with a score below a first predetermined score level. A second indicator represented by the black indicator may be used to identify a match having a score above the first predetermined score level. A third indicator represented by the gray indicator may be used to identify a match having a significant score, or above a second predetermined threshold. In the first grid display 210, query 1 has the first indicator to indicate a match as well as query 5 and query 6. These matches may not have a score rising above a minimal score threshold. As such, the first indicator indicates a match but not a significant score. The second grid display 210' has an indicator for query 11 to indicate a match and no significant score, and an indicator for query 15 to indicate a match with a score above a predetermined threshold but below a significant score threshold. The third grid display 210" has a query 25 and query 26 with a first indicator indicating a match without a significant score. This grid display 210" also has a significant score indicator for query 18 indicating a match with a score exceeding a significant score threshold. Although this example is generally described using indicators having a color, any type and form of indicator may be used as described herein to identify and distinguish between query status and matches at different score levels or thresholds.

One or more thumbnails 220 or reduced graphical representations of grids may be displayed to show a status of any queries of any grid in the hierarchy of grids 205. The thumbnail may comprise any type and form of graphical or textual representation of a grid. In some embodiments, the thumbnail is a miniature or smaller version of a grid display 210. In other embodiments, the thumbnail is a any representation of the grid having a size smaller the original or current size of the grid. The reduced representation 220 of the grid may be reduced slightly or may be reduced significantly. In some embodiments, the size of the thumbnail may be based on the size of the display, the use of multiple monitors, or the available viewable space available on the display.

A thumbnail 220 may be located or placed anywhere on the screen of a display device or any other medium. In some embodiments, a thumbnail is located in any cell of a grid. In one embodiment, the thumbnail is used or placed as a label for a row or column header or for a cell. In another embodiment, the thumbnail may be used as the indicator 240 for a cell. In some embodiments, the thumbnail provides a link, connection to, association or identification of a grid within a grid cell. In other embodiments, a thumbnail is located or displayed on the desktop of the computing device. In another embodiment, a thumbnail may be located or displayed as a free floating and movable icon, shortcut or other element in the background of a display or desktop. In some embodiments, a thumbnails is located or displayed on any other user interface element or widget, such as graphical element representing a folder or on a tab of a tab widget. In yet other embodiments, the thumbnail is placed or maintained off screen and via any sequence of user input, such as selecting a hotkey, the thumbnail may be displayed on screen.

The thumbnail 220 comprises a facsimile or reproduction of a grid, exact, substantially similar, similar or otherwise. In some embodiments, the thumbnail is an exact reproduction of the grid but at a reduced size. In other embodiments, the thumbnail is a similar, substantial or otherwise, reproduction or copy of a grid. In yet another embodiment, the thumbnail is an estimated representation of a grid. In some embodiments, the thumbnail is a simulation of a grid. In various embodiments, the thumbnail or reduced representation shows the grid cells of the grid in the same relative location as the grid cells appear or are arranged in the grid. In another embodiment, the thumbnail may not include any cell dividers but instead the indicators 240 of the grid. In some embodiments, the thumbnail includes grid cell dividers and the indicators 240. In one embodiment, the thumbnail is selectable to drill down to or display the grid associated with or identified by the thumbnail. In another embodiment, each of the grid cells or indicators 240 represented by the thumbnail may be selectable to traverse to or display the corresponding cell of the grid or to traverse to or display a grid linked via the cell.

The data processing system 120 and/or user interface controller and/or workstation 102 may propagate, communicate, distribute or display a status, event, signal or alert of a cell in any grid to any other grid, or cell thereof, or to a thumbnail representation of the grid. For example, the data processing system may propagate a score of a match in a first cell of a grid at a second or lower level in the hierarchy to a grid at a higher level in the hierarchy or a thumbnail representation of the grid. In other embodiments, the data processing system and/or the user interface controller and/or workstation 102 propagates presentation of or changes to an indicator 240 for a cell in a first grid to any grids, such as second grid, in the hierarchy identifying or linking to the grid or to any thumbnail representation of the first grid. The data processing system 120 and/or user interface controller and/or workstation 102 may propagate a query result, status or indicator from an Nth level in the grid hierarchy 205 through higher level grids in the hierarchy to the top grid in the hierarchy. Any thumbnail representation of any grid in the hierarchy may identify or display information indicating the propagated signal, score or information.

FIG. 2A depicts some example propagation of alerts via the hierarchy of grids 205. The second grid display 210' includes a grid cell corresponding to query 15 that monitors one or more data sources. The data processing system 120 may determine the query for this cell matches some received data and presents an indicator 240 to indicate the score of the match. This match and score may be propagated via the hierarchy of grids to other representations of the second grid display, such as the thumbnail in query 7 of the first grid display 210. In another example, the third grid display 210" includes a grid cell for query 18 with an indicator of a match and a score exceeding a predetermined threshold. The data processing system 120 may propagate the alert for the match and score for query 18 to higher level grids such as to the thumbnail representation in the bottom right hand corner of the first grid display 210.

A top level thumbnail 220 as shown at the top of FIG. 2A above the first grid display 210 may be used to monitor alerts from any grid display at any level in the hierarchy below the top level. The thumbnail may display alerts at relative locations within the thumbnail corresponding to a lower level grid and the grid's location within the hierarchy. As shown in this example, this thumbnail 220 shows the alerts from the second grid display 210' and the third grid display 210".

Figure 2B:
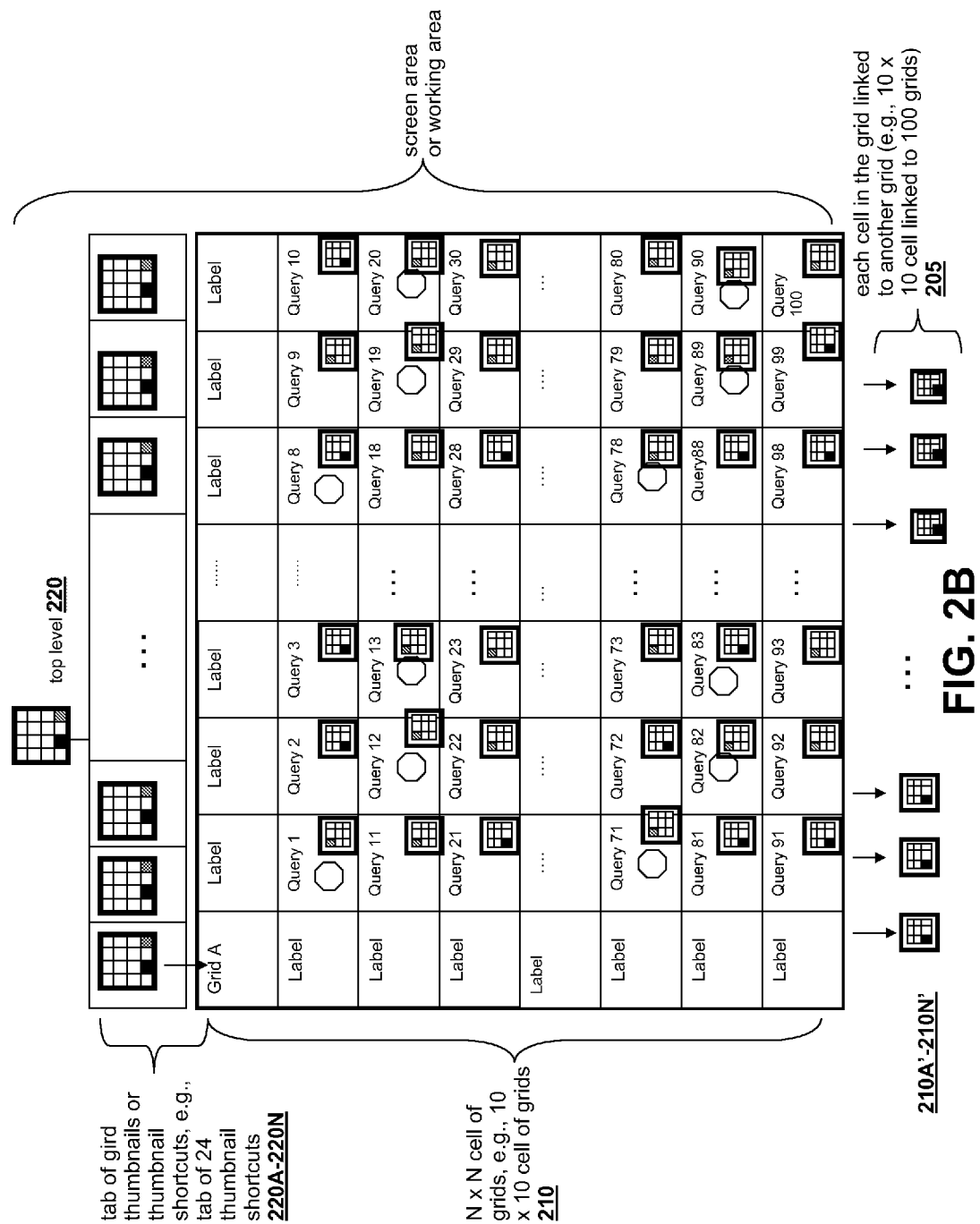
FIG. 2B is a block diagram of another embodiment of a grid of grids hierarchy.

Referring now to FIG. 2B, another embodiment of a hierarchy of grids is depicted. With the "grids of grids" feature, a user may monitor and interface with a large amount of queries for a large number of grids in a hierarchy of grids while at the same time being made aware of alerts deeper within the hierarchy. Using the alert propagating techniques discussed herein, a user, such as an analyst, may more vigilantly monitor activity across the vast number of queries within levels of the hierarchy regardless of which level of the hierarchy or which grid the user may currently have in view. This "grids of grids" and propagation techniques provides for maximizing the use of viewable screen space on a display while at the same time making the user aware of any alerts or other activity off-screen at any level in the hierarchy. Furthermore, the hierarchy of grids allows for the decomposition of a problem or monitored activity into finer or more granular monitoring activity with a progression from the top level grid down to deeper Nth level grids.

In brief overview of FIG. 2B, a hierarchy of grids includes a first grid 210 having N×N number of grid cells. For example, the first grid 210 may include a grid of 10 grid cells by 10 grid cells for a total of 100 grid cells. Each of these N×N grid cells may link to a plurality of grids, such as grids 210A'-210N'. In turn, any of these grids 210A'-210n" may link to or identify yet another plurality of lower level grids, and so on. In some cases, each of the N×N grid cells may identify and/or link to a plurality of different grids at one or more levels lowers in the grid hierarchy 205. In other cases, one or more of the N×N grid cells may link to or identify the same lower level grid. Although this example shows the display supporting a 10×10 grid to reveal thumbnails and queries in the same space to show 100 grids at one time, depending on the size of the display devices and the number of displays for the workstations, a larger number of N×N grid cells with both thumbnails and queries may co-exist.

This user may derive a very large space of grids and entities even within a few nested levels of a grid hierarchy. In the screen area or working area of a display environment as depicted in FIG. 2B, the user interface may include a tab, folder or other user interface element identifying an Nth list of grids 210 at one or more levels in the hierarchy 205. For example, a tab user interface widget may include 24 or more tabbed grids 220A-220N. Each of these tabbed grids may be linked from or children of the same higher level grid, such as the top grid identified by thumbnail representation 210. These tabbed thumbnail representation may provide or act as a shortcut to anywhere in the hierarchy 205. In this example, there may be 24 tabbed grids, each linked to a 10 by 10 grid having a thumbnail monitoring another 10×10 grid of thumbnails. In one view, the user may monitor 100 queries of a first grid at a first level and via the 100 thumbnails 100 additional lower level grids each with 100 or more queries for a total of over 10,000 queries at just two levels of the hierarchy. In another aspect of this example, the user is monitoring directly a first level of the hierarchy represented by the first grid while at the same time monitoring the query status of 100 other lower level grids, and grids linked to or children of these 100 lower level grids provided, in some embodiments, no cycles are created.

Figure 2C:
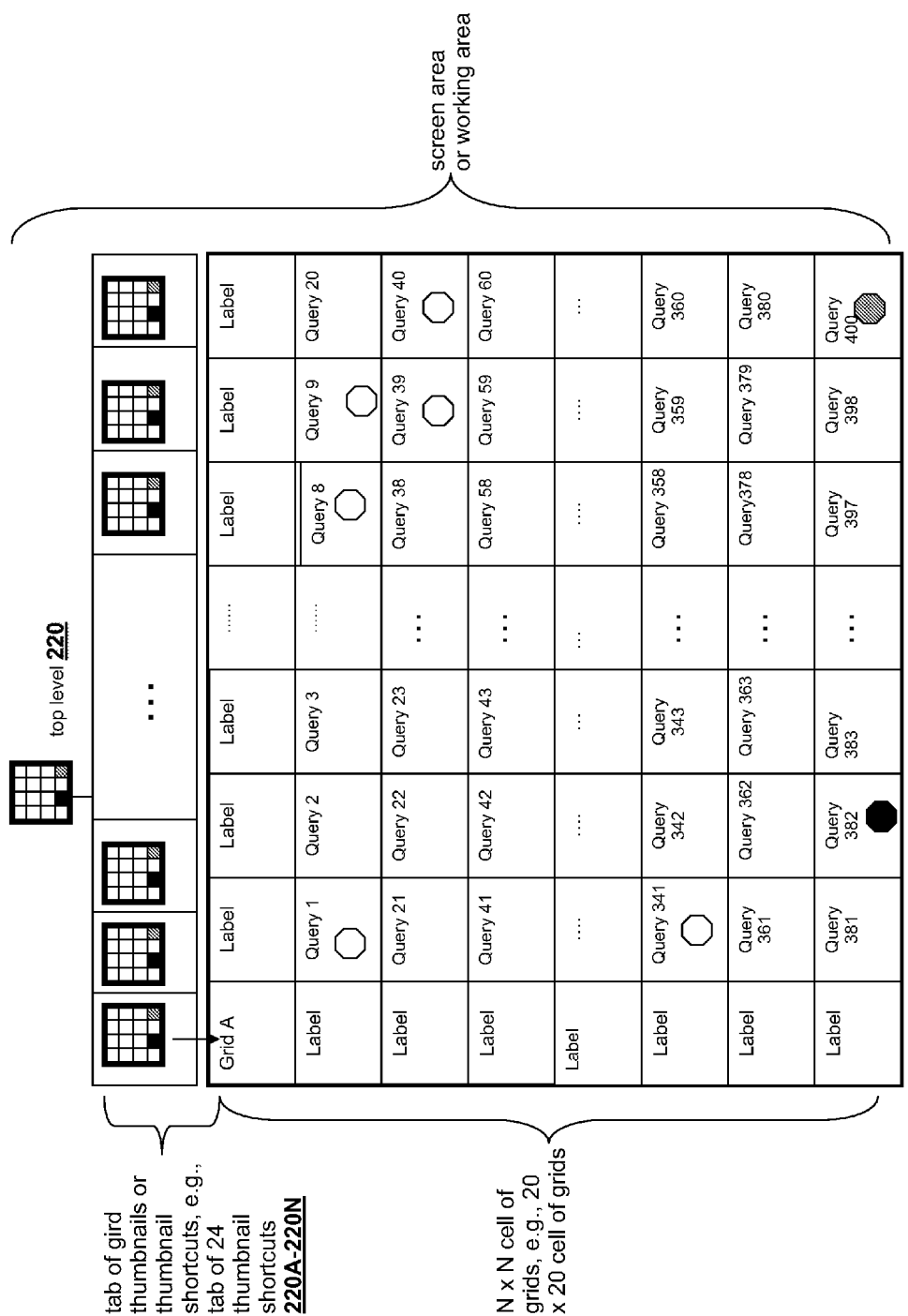
FIG. 2C is a block diagram of yet another embodiment of a grid of grids hierarchy

Referring now to FIG. 2C is another example of a hierarchy of grids. In this example, if there are 24 grids tabbed, and the 24 grids are all children of the top grid (e.g., they are linked to from a cell in the top grid), and each grid has 20×20 grid cells, a user may monitor 9600 entities without scrolling. The user has access to any query with a single click in a 2 level nesting of grids. If the user is viewing the top grid, and the grid has 20×20 grid cells, with each cell including a 20×20 grid, the user can monitor 160000 queries, with each query being one click to see its grid, and a second click to view the query's details.

Figure 2D:
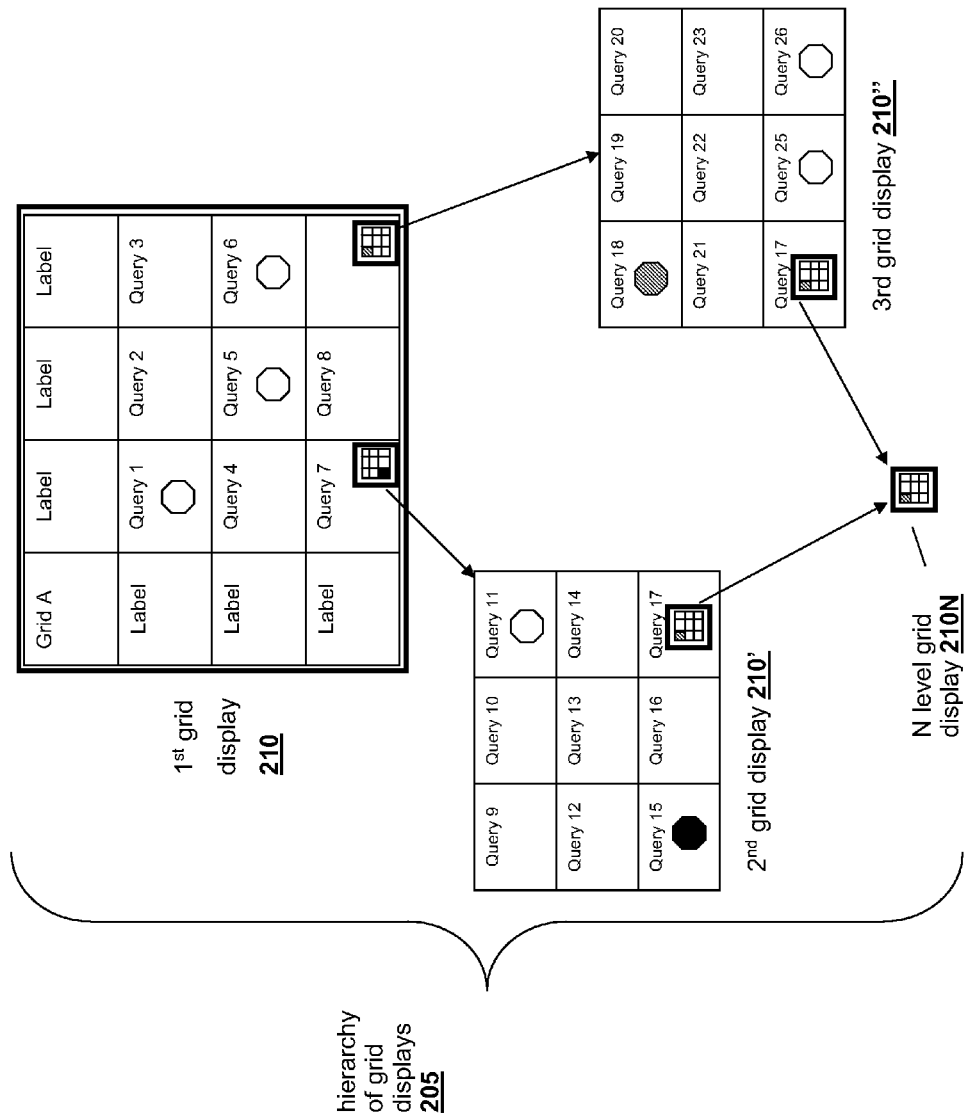
FIG. 2D is a block diagram of an embodiment of a grid linking to other grids in the hierarchy.

Referring now to FIG. 2D, another embodiment of a hierarchy of grids is depicted to illustrate the feature referred to as "deep linking" of grids in the hierarchy of grids. In brief overview, a first grid display 210 in a hierarchy of grids may link via the entity labeled query 7 to a second grid display 210' and via the lower left most grid cell a third grid display 210". The second and third grid displays may be at the same level in the hierarchy or at different levels in the hierarchy. The second and third grid displays may link to or share the same grid 210N at a Nth level in the grid hierarchy 205. Although the system 120 may maintain a single instance of the grid 210N, this grid 210N may be used multiple times in different contexts and at different and multiple levels of the grid hierarchy 205. Although FIG. 2D, displays two grids sharing grid 210N, more than two grids may share the same grid and any two grids may link to or share a plurality of the same grids.

In view of FIGS. 2A-2D, the grid of grids hierarchy as described herein offers a variety of advantages, such as more flexible nesting and grouping of queries, increased capacity to provide information displayed or represented by grid cells that include entities, and the ability to create multiple levels of drill down. Furthermore, the grids of grids hierarchy provides for monitoring many more queries and data sources with all alerts from anywhere in the hierarchy within view. The user may use and see thumbnails that capture activity one level below within either grid tabs or grid cells. The configuration tool provides for importing other grid hierarchies into any place in an existing grid or hierarchy. Additionally, the configuration tool provides for linking to identical grids from multiple cells so that the grid may be referenced from more than one context but edited and maintained in one place.

Furthermore, although the grids of grids technique is generally described in connection with a display of a computing device, these grids of grid techniques may be used for presenting information via any type and form of presentation medium, such as a printer, projection device, holographic device, sensory, force or tactile output medium or any other medium for presenting information.

Figure 3:
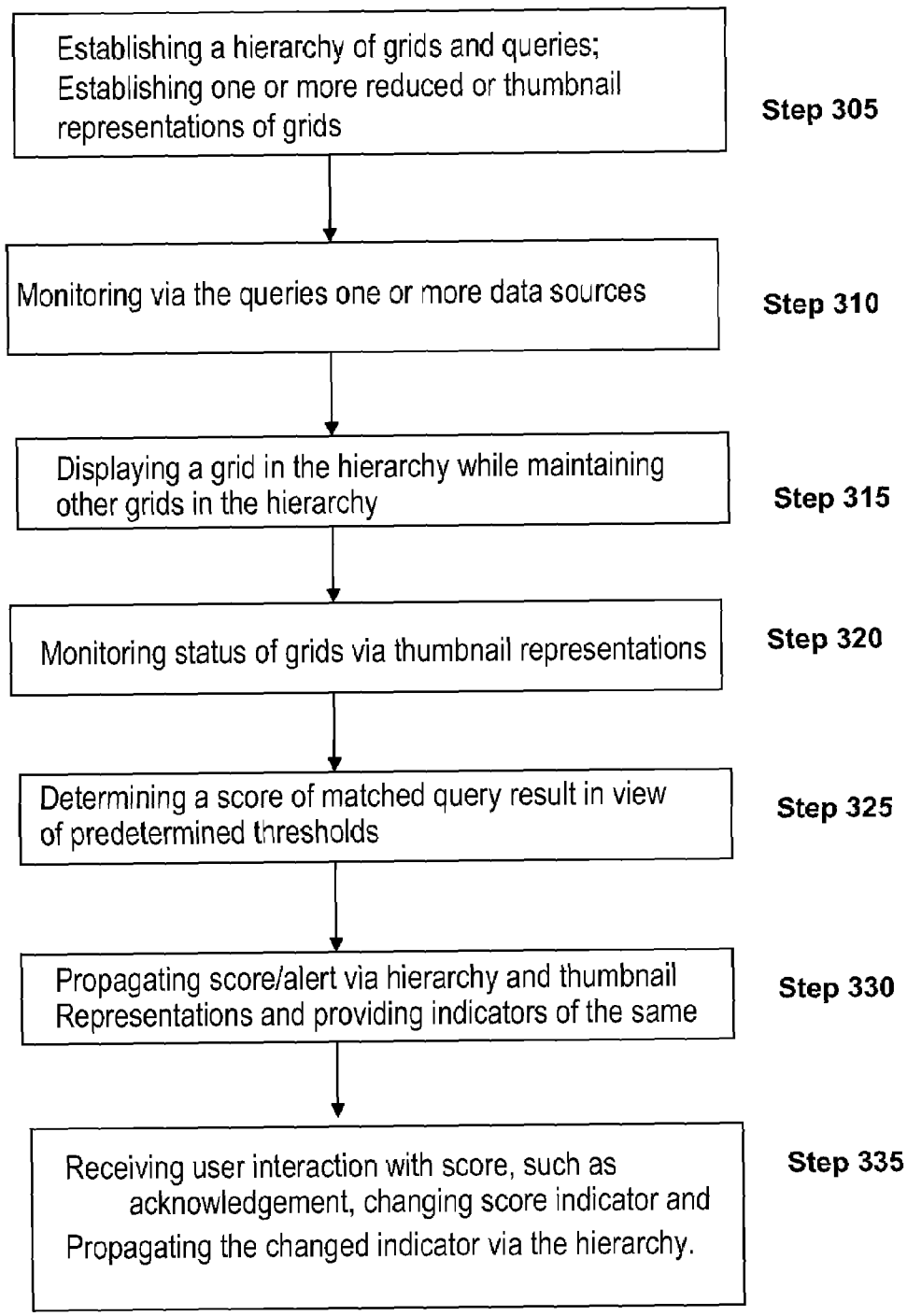
FIG. 3 is a flow diagram depicting an embodiments of steps of a method for propagating alerts via a hierarchy of grids.

Referring now to FIG. 3, an embodiment of steps of a method for practicing the grids of grids and alert propagation via the hierarchy of grids is depicted. In brief overview of method 300, at step 305, a grid of grids hierarchy is established. Each of the grids may have grid cells comprising queries for monitoring one or more data sources. At step 305, one or more reduced representations, such as a thumbnail representation may also be established to monitor one or more grids at any level in the hierarchy. At step 310, the data processing system 120 may monitor the data sources, such as text and market feeds depicted in FIG. 1A, using the queries to determine any matches. At step 315, the user may interact with the data processing system via the user interface controller to view any grid in the hierarchy. At step 320, the user may have one or more thumbnails in view on the desktop or screen to monitor the activity of other grids not in view. At step 325, the data processing system 120 determines a status of a query with respect to the monitored data sources. The data processing system 120 may determine a score for a matched query result exceeds or falls below a predetermined threshold. At step 330, the system provides an indicator 240 for the query in the corresponding grid cell and propagates the score or status of the query via the grid hierarchy to any other grid and/or thumbnail linked to or identifying the grid having this query. At step 335, the system may receive input from the user interfacing with the user interfaces of the grids of grids. For example, a user may acknowledge an alert or score of a query. In response, the system changes the indicator for the query and propagates the changed indicator through out the hierarchy.

In further details, at step 305, a user may configure via a configuration tool or user interface controller 106 a grid of grids or a hierarchy of grids for monitoring one or more data sources. The hierarchy of grids may be established with any number of levels and any number of grids at each level. The user may link, connection or otherwise associate any one grid or grid cell to any other grid or grid cell thereof in the hierarchy. The user may design the grid hierarchy to decompose a problem. In another case, the user may design the levels of the grid hierarchy to provide finer or more granular resolution of the problem and corresponding monitored activity. The user may design, select or specify queries for these grids to identify data in any data source that matches any search term, search parameter or condition. The user may specify or configure the query to be applied to selected or identified data sources. Additionally, the user may identify, specify or configure the type of indicators 240 to provide status of a corresponding query.

The user may also establish, identify or otherwise configure one or more reduced representations of any grid in the hierarchy, such as by placing one or more thumbnails in the user's screen on the workstation 102. In some embodiments the user positions or places one or more thumbnails persistently in the user interface presenting a relational display via one or more display devices. In other embodiments, the user configures or places one or more thumbnail representations in a grid cell with or without a query. In another embodiment, the user configures or specifies the type of indicators to use within the thumbnail representation.

At step 310, the data processing system 120 monitors data received or obtained via one or more data sources. In some embodiments, the data processing system 120 receives data from a plurality of data feeds, such as a market feed and a text feed. The data processing system may process this data to convert into a desired format. Based on the configured queries in the cells of the hierarchy of grids, the data processing system may match query results to the query parameters. The data processing system may generate event records based on the query results and perform scoring on the matched results to provide a match score. The data processing system stores the processed data, such as the event records and corresponding stores to a data store 110.

At step 315, the user may interact with the monitored data maintained and displayed via the hierarchy of grids. The data processing system via the user interface controller may distribute, present or otherwise make available the data, query results, and scores corresponding to the hierarchy or any portion thereof. The user may arrange and organize any of the grids or thumbnail representations in the current view. The user may select any grid cell to look at more details of a query, such as via the relational display of FIG. 1B. The user may drill down via the displayed hierarchy to any other level in the hierarchy to view a grid thereof. The user may select any one or more grids of the hierarchy to be in the current view. In other embodiments, the user views any indicators 240 provided for a query. In another embodiment, the user acknowledges any alerts or indicators 240 via any type and form of user input.

At step 320, the user may display any one or more thumbnails to monitor the status of any queries in the grid hierarchy. The use of these reduced grid representations allows the user to more effectively and efficiently monitor the status of a great many of queries in the grid hierarchy. In some embodiments, the user monitors one or more grids of the hierarchy via any reduced representation 220 of a grid or the hierarchy without any grid displayed in the current view. For example, only a reduced representation of the top level grid may be displayed. In other embodiments, the user monitors the grid hierarchy via any thumbnail representation with one or more grids in view. In another embodiment, the user monitors status of grids in the hierarchy via thumbnail representations in grid cells of the one or more grids in view. The user may display any lower level, or Nth grid, while being able to monitor the status of any other grid via a top or higher level thumbnail representation.

At step 325, the data processing system 120 determines scores for matched queries applied against one or more data sources. In one embodiment, the data processing system 120 determines the score for a match falls within one of a plurality predetermined thresholds. In some embodiments, the data processing system 120 determines the score for the match exceeds a significant threshold or otherwise indicates a significant score. In one embodiment, the data processing system 120 determines the match falls below the significant score threshold.

At step 330, based on the status of query matches and/or scores for matches, the data processing system via the user interface controller may provide a corresponding indicator 240. In some embodiments, the system displays an indicator 240 providing a visual status of the query. In another embodiment, the system produces an indicator 240 providing an audible status of the query. In yet another embodiments, the system outputs any type and form of sensory output to provide an indicator 240. In other embodiments, the system provides indicators 240 of varying graphics, text, animation, colors and/or shapes to distinguish between any level of scoring. In further embodiments, the system provides indicators 240 to indicate whether or not the user has acknowledged a status or condition of a query. In yet another embodiment, the system provides indicators 240 to indicate any temporal status or condition of a query, an indicator, or acknowledgment thereof. The data processing system 120 via the user interface controller 106 propagates any indicator, status or alert corresponding to a query, to any other grid cell, grid or thumbnail representation in the grid of grids.

At step 335, the user may interact with any indicator, status or alert of a query to provided user input with respect thereto. In one embodiment, the user may acknowledge an alert, such as a significant score, for a grid cell. In other embodiments, the user may annotate or provides comments for any query or grid cell. In some embodiments, the user may traverse via the hierarchy of grids, such as via drill drown to view and/or interface with any indicator, status or alert of a query or grid cell. In response to the user input, the system may change any appearance or behavior of an indicator. In other embodiments, the system may change a first indicator to a second indicator based on the user input. In another embodiment, the system may remove an indicator based on the user input. In one embodiment, the system may provide an additional indicator based on the user input. The data processing system 120 via the user interface controller 106 may propagate any of these changes responsive to the user input to any other grid cell, grid or thumbnail representation in the grid of grids.

What is claimed is:

1. A method for providing in a first grid display an alert of a status of a query from a second grid display of a plurality of grid displays arranged in a hierarchy, a grid display providing an arrangement of grid cells, each grid cell comprising one or more elements for indicating the status of the query monitoring one or more data sources, the method comprising the steps of:

(a) displaying on a screen a first grid display at a first level in a hierarchy of grid displays, the first grid display having a first arrangement of grid cells, each of the grid cells comprising an element for indicating status of a query monitoring one or more data sources, one or more grid cells of the first arrangement identifying one or more grid displays at a second level in the hierarchy different than the first level;

(b) displaying a reduced representation of a second grid display as an element in a first grid cell of the first grid display to identify status of a plurality of queries within the second grid display, the second grid display maintaining off the screen a second arrangement of grid cells comprising queries monitoring one or more data sources;

(c) determining a status of a match of the query with data from the one or more monitored data sources, the query is identified by a second grid cell of the second grid display; and (d) providing, in response to the determination, an indicator of the status of the query at a location in the reduced representation corresponding to a relative location of the second grid cell within the second grid display.

2. The method of claim 1, wherein step (c) further comprises determining a score of the match one of exceeds or falls below a predetermined threshold.

3. The method of claim 2, wherein step (d) further comprises displaying, in response to the determination, the indicator to identify the score exceeds the predetermined threshold.

4. The method of claim 2, wherein step (d) further comprises displaying, in response to the determination, the indicator to identify the score falls below the predetermined threshold.

5. The method of claim 1, wherein step (d) further comprises displaying, in response to the determination, the indicator to indicate existence of the match.

6. The method of claim 1, wherein step (d) further comprises displaying the indicator with one of the following to correspond to the determined status: a predetermined color, a predetermined animation, a predetermined shape, a predetermined audio, and a predetermined text.

7. The method of claim 1, wherein step (d) further comprises providing indicators for each of the queries of the second grid display at locations in the reduced representation corresponding to relative locations of the grid cells corresponding to each of the queries within the second grid display.

8. The method of claim 1, wherein step (c) further comprises determining a result of the query matches one or more search terms.

9. The method of claim 1, wherein the second grid display is at a level in the hierarchy lower than the first grid display.

10. The method of claim 1, comprising displaying a second reduced representation to identify the status of queries corresponding to relative locations of grid cells in one of the first grid display or a third grid display in the hierarchy.

11. The method of claim 1, comprising maintaining, by a third grid display identified via a third grid cell of the second grid display, a third arrangement of grid cells comprising queries monitoring one or more data sources.

12. The method of claim 11, comprising determining the status of the match of the query corresponding to a fourth grid cell of the third grid display with data from the one or more monitored data sources, and providing, in response to the determination, the indicator of the status of the query at the location in the reduced representation corresponding to the relative location of the third grid cell within the second grid display.

13. The method of claim 1, comprising identifying, by the first grid display and the second grid display via one or more grid cells, the same third grid display, the first grid display and the second display at one of a same or a different level in the hierarchy of grids.

14. The method of claim 1, wherein the reduced representation comprises a thumbnail.

15. The method of claim 1, wherein the indicator comprises one of a visual, audio, force or tactile indicator.

16. A method for identifying in a reduced representation of a grid display a status of queries from a plurality of grid displays arranged in a hierarchy, a grid display maintaining an arrangement of grid cells, each grid cell comprising a graphical element for visually indicating the status of a query monitoring one or more data sources, the method comprising the steps of:
  (a) maintaining, via a plurality of grid displays arranged in a hierarchy having a plurality of levels, an arrangement of grid cells, each grid cell comprising an element for indicating status of one or more queries monitoring one or more data sources;
  (b) displaying on a screen a reduced representation of a grid to identify status of queries within one or more grid displays below an identified level in the hierarchy, each location of a status identifier in the reduced representation corresponds to a relative location of a grid display below the identified level;
  (c) determining the status of a match of a query corresponding with data from the one or more monitored data sources, the query identified by a first grid cell of a first grid display, the first grid display identified via one or more grid cells of the one or more grid displays; and
  (d) displaying, in response to the determination, an indicator of the status of the query at the location in the reduced representation corresponding to the status identifier for the one or more grid displays identifying the first grid display.

17. The method of claim 16, further comprising maintaining, by the first grid display at a level in the hierarchy two or more levels below the identified level, a first arrangement of grid cells.

18. The method of claim 17, further comprising maintaining, by the first grid display, the first arrangement of grid cells off the screen.

19. The method of claim 17, further comprising displaying, the first grid display, on screen, the first grid display displaying graphical elements in grid cells to visually indicate the status of a corresponding query.

20. The method of claim 16, wherein step (d) further comprises displaying, in response to the determination, the indicator to identify existence of the match.

21. The method of claim 16, wherein step (b) further comprises determining a score of the match one of exceeds a predetermined threshold or falls below the predetermined threshold.

22. The method of claim 21, wherein step (c) further comprises displaying the indicator to identify the score.

23. The method of claim 16, wherein step (b) further comprises displaying a thumbnail representation in a view of a user without displaying in the view of the user the one or more grid displays below the identified level.

24. The method of claim 16, wherein step (d) further comprises providing visual indicators in a plurality of locations in the reduced representation to identify status of the queries corresponding to each of the plurality of display grids.

25. The method of claim 16, wherein the reduced representation comprises a thumbnail.

* * * * *

UNITED STATES PATENT AND TRADEMARK OFFICE
CERTIFICATE OF CORRECTION

PATENT NO. : 8,099,681 B2
APPLICATION NO. : 12/024722
DATED : January 17, 2012
INVENTOR(S) : William J. Flanagan et al.

It is certified that error appears in the above-identified patent and that said Letters Patent is hereby corrected as shown below:

On the title page item (75), please change inventor "Tom Lee" to read -- Thom Lee --.

Signed and Sealed this
Ninth Day of April, 2013

Teresa Stanek Rea
*Acting Director of the United States Patent and Trademark Office*